(12) United States Patent
Stoops et al.

(10) Patent No.: US 6,380,505 B1
(45) Date of Patent: Apr. 30, 2002

(54) METHOD AND APPARATUS FOR WELDING TUBULAR MEMBERS

(75) Inventors: Paul M. Stoops, Pacific; Joseph P. Fortin, Marysville, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/535,222

(22) Filed: Mar. 27, 2000

(51) Int. Cl.$^7$ ............................. B23K 9/02; B23K 9/12
(52) U.S. Cl. ............................. 219/60 A; 219/125.11
(58) Field of Search ............................. 219/61, 60 R, 219/60 A, 54, 125.11

(56) References Cited

U.S. PATENT DOCUMENTS

| | | | |
|---|---|---|---|
| 3,238,347 A | | 3/1966 | Rohrberg et al. |
| 3,400,237 A | | 9/1968 | Kazlauskas |
| 3,461,265 A | | 8/1969 | Spiro |
| 3,636,294 A | * | 1/1972 | Peyrot ....................... 219/60 A |
| 3,668,359 A | | 6/1972 | Emmerson |
| 3,688,069 A | | 8/1972 | Kazlauskas |
| 3,726,462 A | * | 4/1973 | Ronnkvist ....................... 228/6 |
| 3,823,298 A | | 7/1974 | Rohrberg et al. |
| 3,828,156 A | * | 8/1974 | Fulks ....................... 219/60 A |
| 3,873,798 A | * | 3/1975 | Friedman et al. ......... 219/60 A |
| 4,009,360 A | | 2/1977 | Beetham |
| 4,038,509 A | | 7/1977 | Henderson et al. |
| 4,161,640 A | | 7/1979 | Bromwich et al. |
| 4,168,406 A | | 9/1979 | Torrani |
| 4,179,059 A | * | 12/1979 | Chang et al. ................ 228/103 |
| 4,379,215 A | | 4/1983 | Rohrberg |
| 4,480,171 A | * | 10/1984 | Christiansen et al. ....... 219/136 |
| 4,542,276 A | | 9/1985 | van der Berg |
| 4,698,474 A | * | 10/1987 | Gugel et al. ............... 219/60 A |
| 4,810,848 A | | 3/1989 | Kazlauskas |
| 4,841,115 A | | 6/1989 | Severin et al. |
| 4,857,690 A | | 8/1989 | Kazlauskas |
| 4,868,367 A | * | 9/1989 | Benway et al. ............. 219/161 |
| 4,922,073 A | | 5/1990 | Weir |
| 5,075,527 A | | 12/1991 | Ikuma |
| 5,107,090 A | | 4/1992 | Caillet et al. |
| 5,126,523 A | | 6/1992 | Rinaldi |
| 5,136,134 A | | 8/1992 | Benway et al. |
| 5,196,664 A | | 3/1993 | McGushion |
| 5,220,144 A | | 6/1993 | Jusionis |
| 5,223,686 A | | 6/1993 | Benway et al. |

(List continued on next page.)

*Primary Examiner*—Tom Dunn
*Assistant Examiner*—Zidia Pittman
(74) *Attorney, Agent, or Firm*—Alston & Bird LLP

(57) ABSTRACT

The present invention provides a welding apparatus for forming a weld joint between abutting ends of first and second tubular members. The welding apparatus includes a housing having first and second sides defining an interior therebetween. The welding apparatus includes a welding electrode movably mounted within the interior of the housing and projecting toward the abutting ends of the first and second tubular members to thereby define an arc gap between the electrode and the abutting ends. The welding apparatus includes an electrical source for supplying welding energy to the welding electrode and a pressurized-gas source for supplying inert gas to the arc gap. The welding apparatus includes a chuck assembly secured to the first side of the housing and having a plurality of chuck jaws for frictionally engaging the surface of the first tubular member to thereby secure the abutting end of the first tubular member within the interior of the housing adjacent the welding electrode. The welding apparatus also includes a support tool for supporting the second tubular member such that the abutting end of the second tubular member is secured within the interior of the housing adjacent the welding electrode and the abutting end of the first tubular member. In one embodiment, the welding apparatus includes a motor in operable communication with the welding electrode such that the welding electrode is moved circumferentially about the abutting ends of the first and second tubular members to thereby form the weld joint.

38 Claims, 11 Drawing Sheets

U.S. PATENT DOCUMENTS

| | | |
|---|---|---|
| 5,288,963 A | 2/1994 | Jusionis |
| 5,302,795 A * | 4/1994 | Kurokawa et al. .......... 219/59.1 |
| 5,310,982 A * | 5/1994 | Jusionis ....................... 219/61 |
| 5,571,431 A * | 11/1996 | Lantieri et al. ........ 219/130.01 |
| 5,655,699 A | 8/1997 | McGushion |
| 5,674,411 A * | 10/1997 | Hanson et al. ................. 219/61 |
| 5,685,996 A * | 11/1997 | Ricci ...................... 219/121.39 |
| 5,710,403 A | 1/1998 | Jusionis |
| 5,837,966 A | 11/1998 | Timmons, Jr. |
| 5,841,089 A | 11/1998 | Martinenas |
| 5,844,190 A | 12/1998 | Benway et al. |

\* cited by examiner

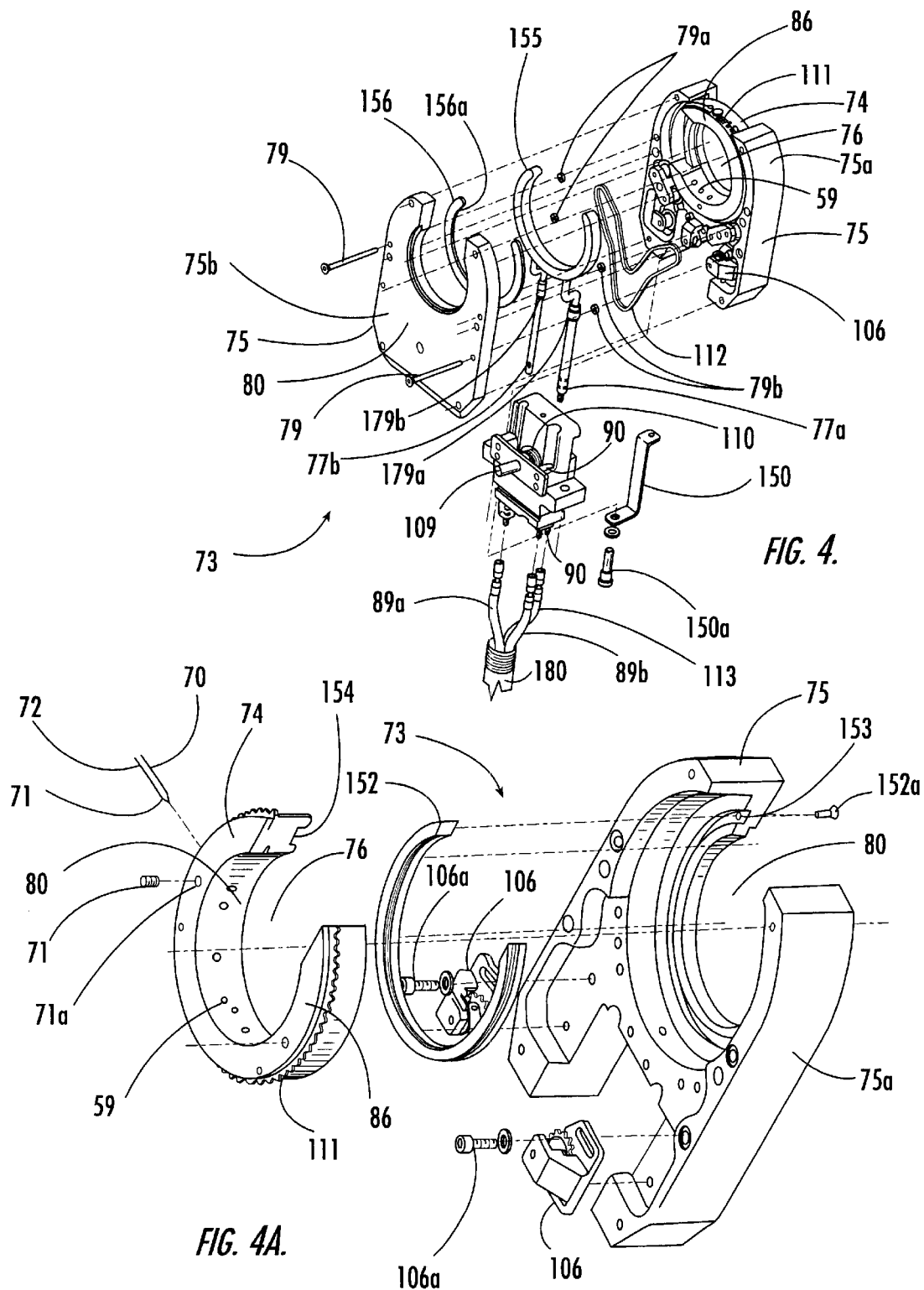

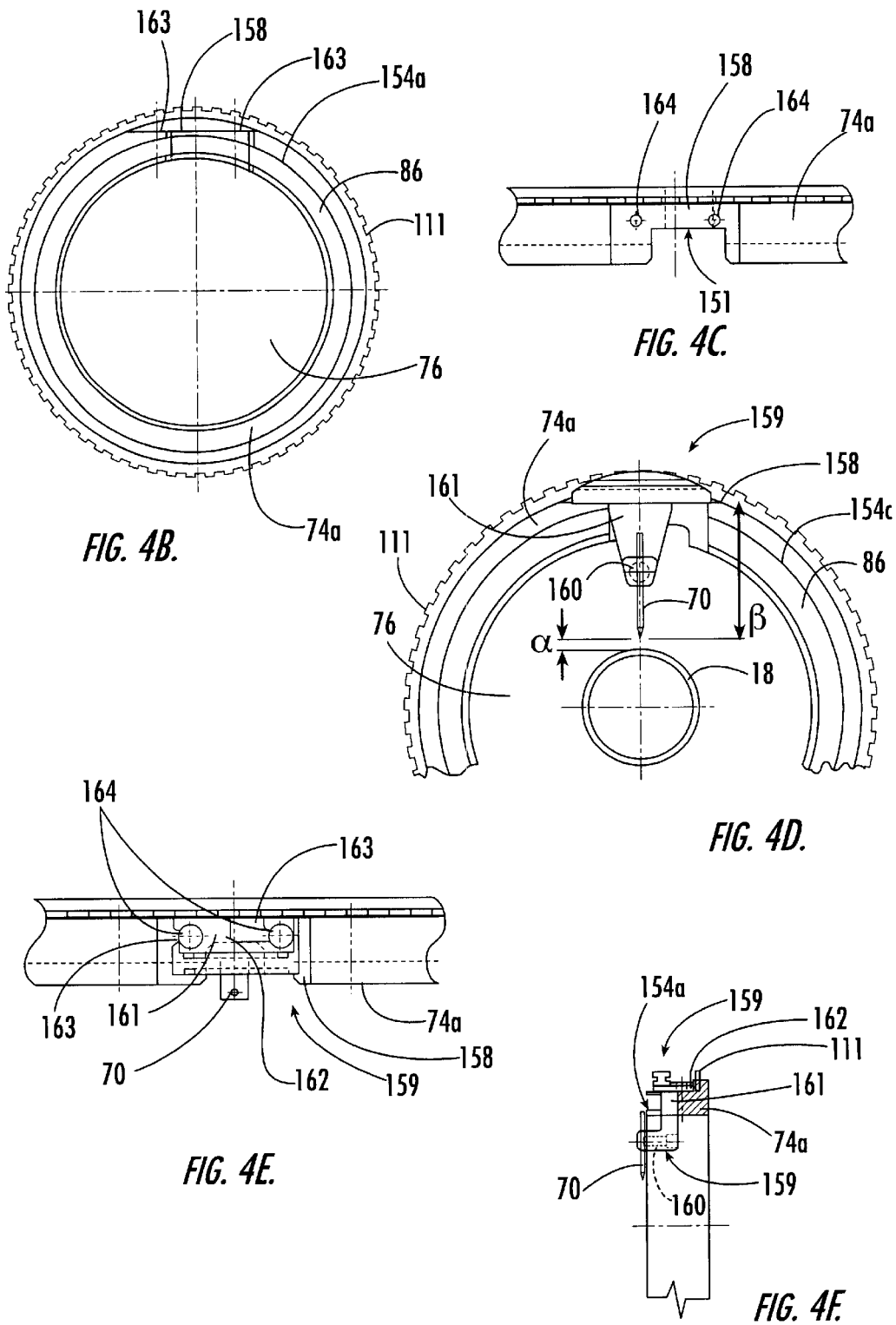

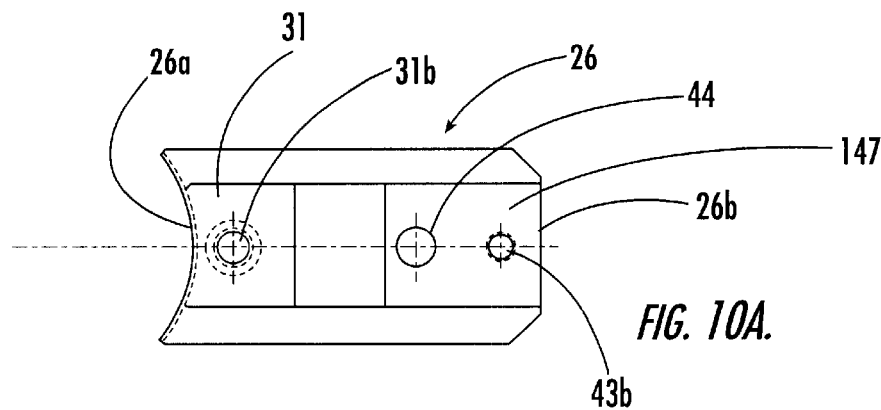
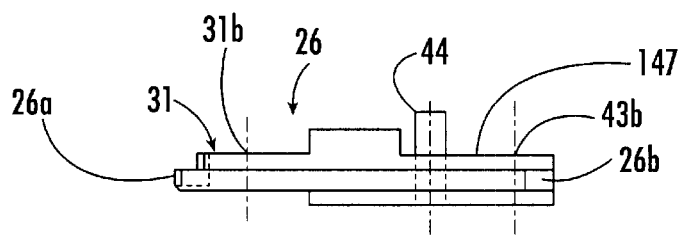
FIG. 10B.
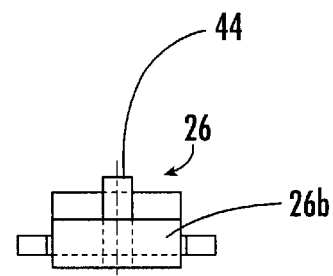
FIG. 10C.
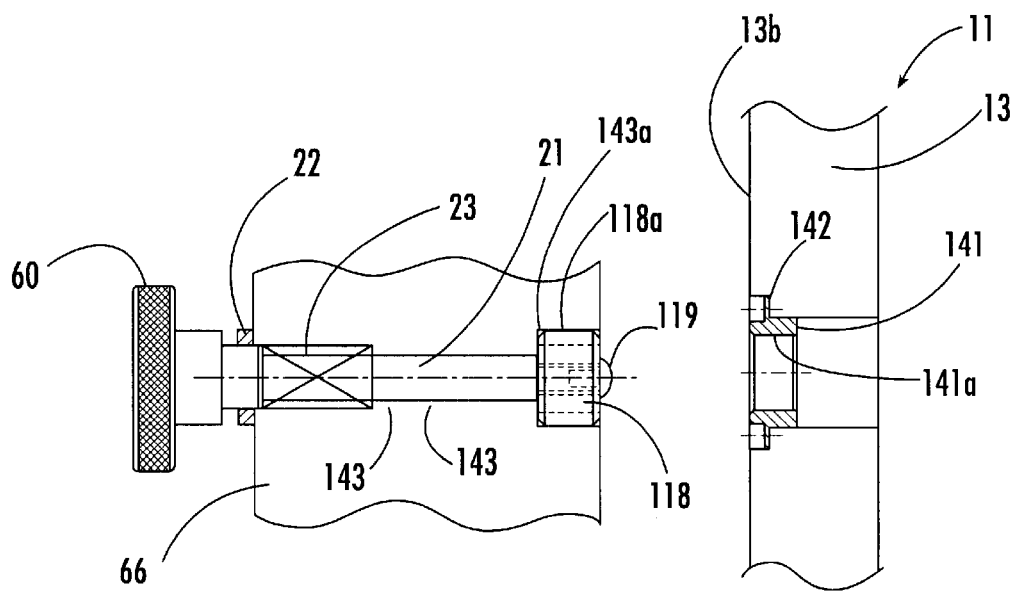
FIG. 11.

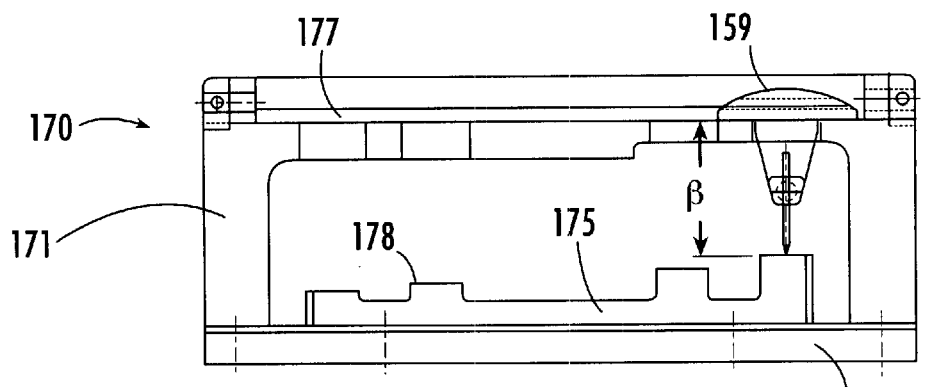
FIG. 12.
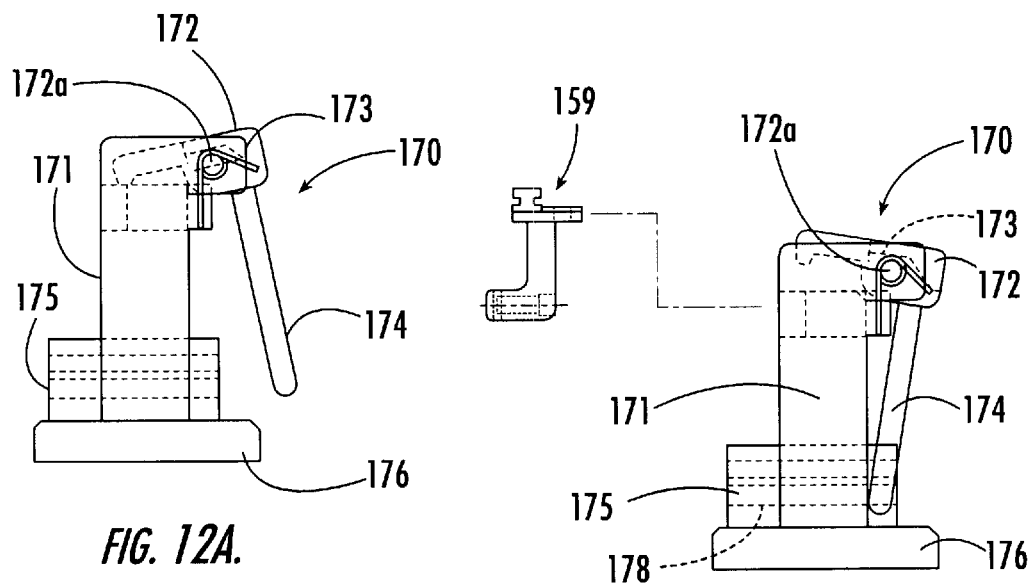
FIG. 12A.
FIG. 12B.
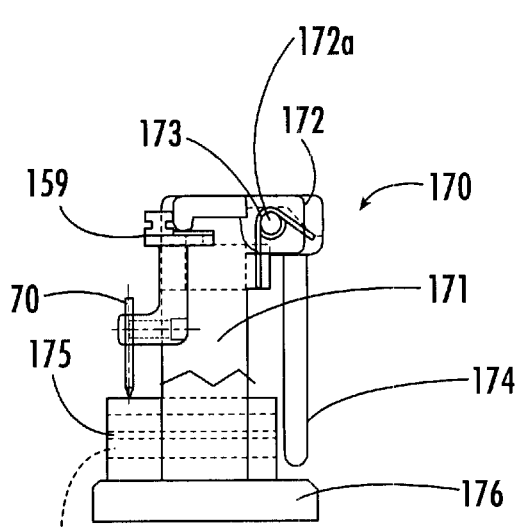
FIG. 12C.

METHOD AND APPARATUS FOR WELDING TUBULAR MEMBERS

FIELD OF THE INVENTION

The present invention relates to welding and, more particularly, relates to welding the abutting ends of tubular members.

BACKGROUND OF THE INVENTION

Conventionally, tubular members, such as hydraulic piping and end fittings for piping, are welded together by forming a weld joint along a circumferential path defined by the interface of the abutting ends of the coaxially aligned members. For example, in the aerospace industry, piping and end fittings are typically welded together through a process known as gas tungsten-arc welding ("GTAW"), although other welding processes may be used depending on the material used to form the tubular members. During the GTAW process, an arc is established between the tubular members and a nonconsumable tungsten electrode positioned adjacent the interface of the abutting ends of the tubular members. The weld area is shielded with an inert gas, such as argon, helium or a mixture of these gases, prior to, during and after welding. The GTAW process is used for a variety of metals, including aluminum, magnesium, titanium, stainless steel, and refractory metals, and produces high quality weld joints with good surface finish.

When welding tubular members using the GTAW process, an orbital welding device is typically used to move the electrode along the circumferential path defined by the interface of the abutting ends of the coaxially aligned tubular members. One example of an orbital welding device is disclosed in U.S. Pat. No. 4,810,848 to Kazlauskas, which discloses a portable tube welder having a gear driven spur gear rotatably mounted within a housing. Openings are provided on opposite sides of the housing to receive the abutting ends of the tubes. Similarly, the spur gear defines an opening, which is coaxially aligned with the openings in the sides of the housing, to receive the abutting ends of the tubes. An electrode is mounted on the spur gear such that as the spur gear is rotated, the electrode moves along a circumferential path defined by the interface of the abutting ends of the tubes to form a weld joint. Prior to welding, the abutting ends of the tubes are secured in place within the opening defined by the spur gear using clamshell-type clamps mounted to the corresponding sides of the housing. Each clamp includes two hinged clamping plates with an over-center locking mechanism to latch the clamping plates around the tubes.

However, the clamshell-type clamps disclosed in the '848 patent are not particularly suited for high volume usage, since securing the abutting ends of the tubes in place within the opening defined by the spur gear can be both labor and time intensive. In addition, to facilitate mobility, the housing of portable tube welders, such as the welder disclosed in the '848 patent, are typically designed to provide only minimal support to the clamshell-type clamps and, thus, high volume usage can lead to bending or warping of the portions of the clamps that contact the tubes, as well as the housing. Damage to the portions of the clamps that contact the tubes and/or the housing can result in misalignment of the tubes inside the spur gear, which in turn can lead to defective weld joints. In addition, while clamshell-type clamps may provide adequate support for short, small diameter tubes, such clamps typically do not provide adequate support for long and/or large diameter tubes, such as those used during the fabrication of commercial and military airplanes and the like.

Thus, there is a need for an improved orbital welding device for forming weld joints about the ends of abutting tubular members. The welding device should be capable of effectively supporting the tubular members during welding and allow for the efficient insertion and removal of the tubular members before and after welding. Additionally, the welding device should be easily adaptable to varying tube geometries and sizes.

SUMMARY OF THE INVENTION

The present invention provides an apparatus for forming a weld joint between abutting ends of first and second tubular members. The welding apparatus includes a housing having first and second sides defining an interior therebetween. The first side of the housing defines an aperture adapted to at least partially receive the abutting end of the first tubular member. The second side of the housing defines an aperture coaxially aligned with the aperture defined by the first side and adapted to at least partially receive the abutting end of the second tubular member. According to one embodiment, the housing comprises a base plate to support the housing. According to another embodiment, the interior of the housing is water-cooled.

The welding apparatus includes a welding electrode movably mounted to the interior of the housing and projecting toward the abutting ends of the first and second tubular members to thereby define an arc gap between the electrode and the abutting ends. According to one embodiment, the welding electrode comprises a nonconsumable tungsten electrode. According to another embodiment, the housing includes a hinged portion between the first and second sides of the housing for observing the positioning of the abutting ends of the first and second tubular members relative to the welding electrode. The welding apparatus includes an electrical source for supplying welding energy to the welding electrode and a pressurized-gas source for supplying inert gas to the arc gap. The inert gas may include argon, helium or a mixture of these gases.

The welding apparatus includes a chuck assembly secured to the first side of the housing. According to one embodiment, the chuck assembly includes a plurality of slidable chuck jaws each having first and second ends. The first end of each chuck jaw defines a gripping surface for frictionally engaging at least a portion of the surface of the first tubular member such that the abutting end of the first tubular member is secured within the interior of the housing adjacent the welding electrode. The chuck assembly includes means, in operable communication with the chuck jaws, for moving the chuck jaws to thereby urge at least a portion of each of the gripping surfaces into frictional engagement with the surface of the first tubular member. According to another embodiment, the first ends of the chuck jaws include replaceable inserts to accommodate different diameter tubular members. According to another embodiment, the chuck jaws are electrically grounded to the housing.

According to still another embodiment, the chuck assembly includes a plurality of slidable chuck jaws each having first and second ends and first and second sides. The first end of each chuck jaw defines a gripping surface for frictionally engaging at least a portion of the surface of the first tubular member. The first side of each chuck jaw includes a pin protruding therefrom. The chuck assembly, according to this embodiment, also includes a rotatable plate defining a plurality of arcuate slots each adapted to receive the pin protruding from the first side of one of the chuck jaws.

Advantageously, rotation of the plate moves the pin radially along a path defined by the arcuate slot to thereby urge at least a portion of each of the gripping surfaces into frictional engagement with the surface of the first tubular member to thereby secure the abutting end of the first tubular member within the interior of the housing adjacent the welding electrode.

The welding apparatus also includes a support tool for supporting the second tubular member. The support tool is attached to the second side of the housing opposite the chuck jaws such that the abutting end of the second tubular member is secured within the interior of the housing adjacent the welding electrode and the abutting end of the first tubular member. According to one embodiment, the support tool is slidably attached to the second side of the housing opposite the chuck jaws such that the support tool is movable relative to the second side of the housing to position the abutting end of the second tubular member within the interior of the housing adjacent the welding electrode and the abutting end of the first tubular member. According to another embodiment, the support tool includes a plurality of support shafts slidably mounted to the second side of the housing such that the support tool is movable relative to the second side of the housing. The support tool may comprise a chuck assembly or a collet.

According to one embodiment, the welding apparatus includes means, in operable communication with the welding electrode, for moving the electrode circumferentially about the abutting ends of the first and second tubular members to thereby form the weld joint. The moving means may include a drive assembly and a motor in operable communication with the drive assembly. The drive assembly may include a belt drive, a gear drive or a combination of both. According to one embodiment, the drive assembly includes a slip clutch. According to another embodiment, the welding apparatus includes computing means in electrical communication with the motor. According to another embodiment, the motor includes a tachometer and the computing means includes an analog computer. According to still another embodiment, the motor includes a digital encoder and the computing means includes a digital computer.

According to another embodiment, the welding apparatus includes a motor in operable communication with the welding electrode such that the welding electrode is moved circumferentially about the abutting ends of the first and second tubular members to thereby form the weld joint. According to one embodiment, the motor includes a drive assembly, wherein the drive assembly may include a belt drive, a gear drive or a combination of both. According to another embodiment, the drive assembly includes a slip clutch. According to another embodiment, the welding apparatus includes a computing means in electrical communication with the motor. According to another embodiment, the motor includes a tachometer and the computing means includes an analog computer. According to still another embodiment, the motor includes a digital encoder and the computing means includes a digital computer.

The present invention also provides a method of welding the abutting ends of first and second tubular members, including the steps of inserting the abutting end of the first tubular member into an aperture defined by a first side of a housing, the housing having a welding electrode movably mounted therein and projecting toward the abutting end of the first tubular member to thereby define an arc gap between the welding electrode and the abutting end of the first tubular member. A plurality of slidable chuck jaws are moved into frictional engagement with at least a portion of the surface of the first tubular member such that the abutting end of the first tubular member is secured within the aperture defined by the housing adjacent the welding electrode. A second tubular member is attached to a support tool. The abutting end of the second tubular member is inserted into an aperture defined by a second side of the housing such that the abutting end of the second tubular member is adjacent the welding electrode and the abutting end of the first tubular member. According to one embodiment, the inserting step includes moving the support tool toward the aperture defined by the second side of the housing. Inert gas is injected into the arc gap to shield the weld area from contaminants. According to another embodiment, the step of inserting a first tubular member follows the step of inserting a second tubular member. An arc is formed between the welding electrode and the abutting ends of the first and second tubular members. The welding electrode is moved in a circumferential path about the abutting ends of the first and second tubular members to thereby form a weld joint. According to one embodiment, the method may include the steps of measuring the angular velocity of the motor and then automatically adjusting the angular velocity of the motor to thereby modify the position of the welding electrode about the abutting ends of the first and second tubular members. After the abutting ends of the first and second tubular members have been welded together the plurality of slidable chuck jaws are moved out of frictional engagement with the surface of the first tubular member. The welded assembly can then be removed through the aperture defined by the first side of the housing.

Accordingly, there has been provided an orbital welding device and associated method of manufacture for forming weld joints about the ends of abutting tubular members. The welding device is capable of effectively supporting the tubular members during welding and allows for the efficient insertion and removal of the tubular members before and after welding. Additionally, the welding device is easily adaptable to varying tube geometries and sizes.

DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIG. 4 is an exploded perspective view of a modified commercially available orbital weld assembly, according to one embodiment of the present invention;

FIG. 4A is a partial exploded perspective view of the modified commercially available orbital weld assembly of FIG. 4;

FIG. 4B is a plan view of a rotor, according to another embodiment of the present invention;

FIG. 4C is a plan view of the rotor of FIG. 4B;

FIG. 4D is a plan view of the rotor of FIG. 4B with an electrode holder securing a welding electrode, according to one embodiment of the present invention;

FIG. 4E is a fragmentary plan view of the rotor, electrode holder and welding electrode of FIG. 4D;

FIG. 4F is a fragmentary plan view of the rotor, electrode holder and welding electrode of FIG. 4D;

FIG. 10A is a plan view illustrating a chuck jaw adapted to receive a replaceable chuck jaw insert, according to one embodiment of the present invention;

FIG. 10B is a plan view illustrating the chuck jaw of FIG. 10A;

FIG. 10C is plan view illustrating the chuck jaw of FIG. 10A;

FIG. 11 is a partial cross-sectional view illustrating the shuttle locking knob, according to one embodiment of the present invention;

FIG. 12 is a plan view of an electrode set gage, according to one embodiment of the present invention;

FIG. 12A is a plan view of an electrode set gage of FIG. 12 with the electrode holder removed;

FIG. 12B is an exploded view of the electrode set gage of FIG. 12A and a electrode holder;

FIG. 12C is a plan view of the electrode set gage and electrode holder of FIG. 12C.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
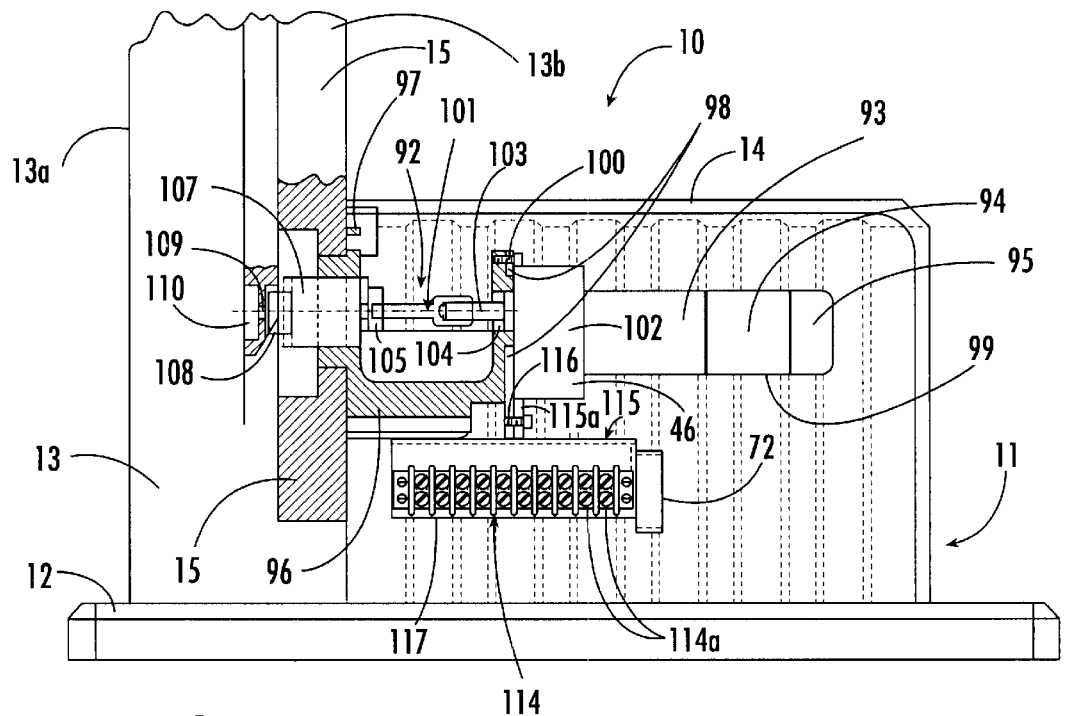
FIG. 1 is a fragmentary cross-sectional view illustrating the drive assembly and motor of the welding apparatus, according to one embodiment of the present invention.
Figure 2:
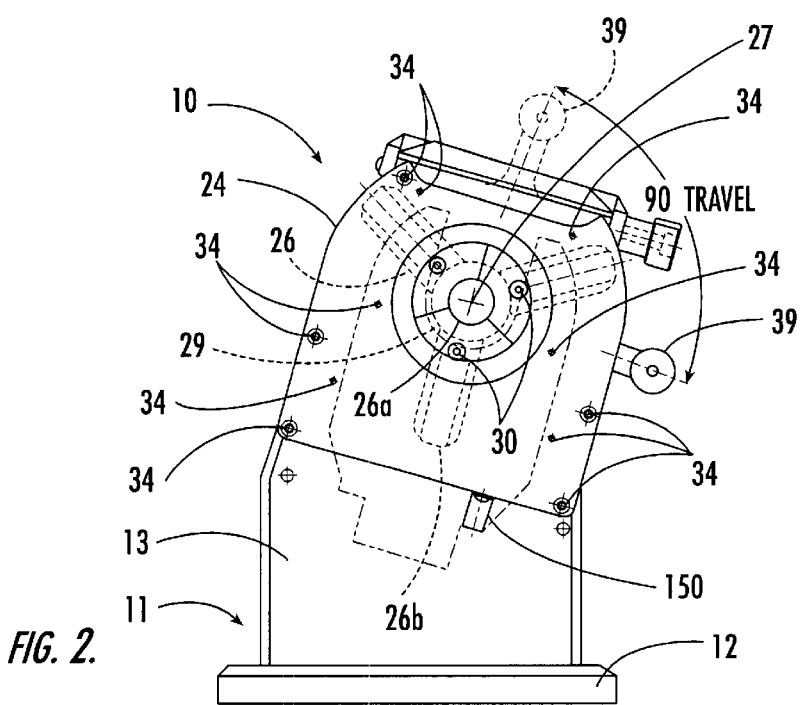
FIG. 2 is a plan view illustrating the chuck assembly, according to one embodiment of the present invention.
Figure 3:
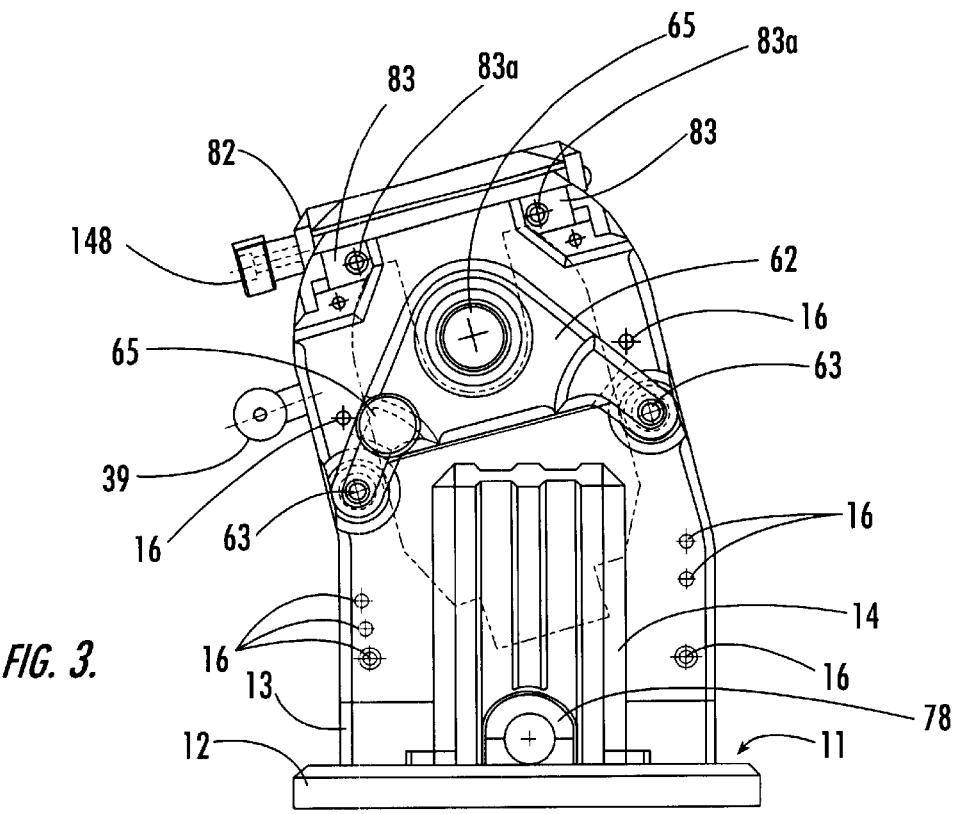
FIG. 3 is a plan view illustrating the support tool, according to one embodiment of the present invention.

Referring to the drawings and, in particular to FIGS. 1, 2 and 3, there is shown an apparatus 10 for welding tubular members ranging in diameter from ¼ to 2 inches, according to one embodiment of the present invention. The apparatus includes a housing 11 having a base plate 12, a body portion 13, and a motor cover 14. The housing 11 is preferably constructed of a non-magnetic material having a high thermal conductivity and a high strength to weight ratio, such as aluminum or an aluminum alloy. To facilitate maintenance and servicing of the welding apparatus 10, the body portion 13 and motor cover 14 of the housing can be mounted together and to the base plate 12 using suitable fasteners, such as bolts, as is known in the art. Advantageously, the base plate 12, which supports the housing, can be fixedly mounted to a workbench or other support structure (not shown).

Figure 9A:
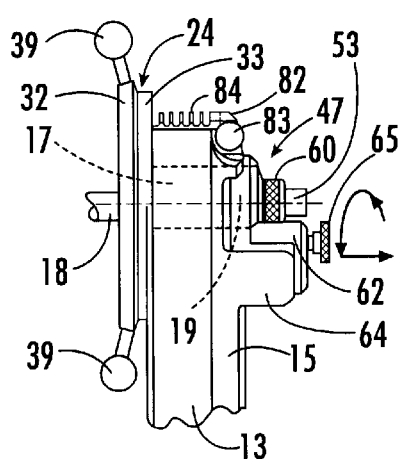
FIG. 9A is plan view illustrating unlocking of the support tool of FIG. 3 to allow movement of the support tool relative to the housing.
Figure 9B:
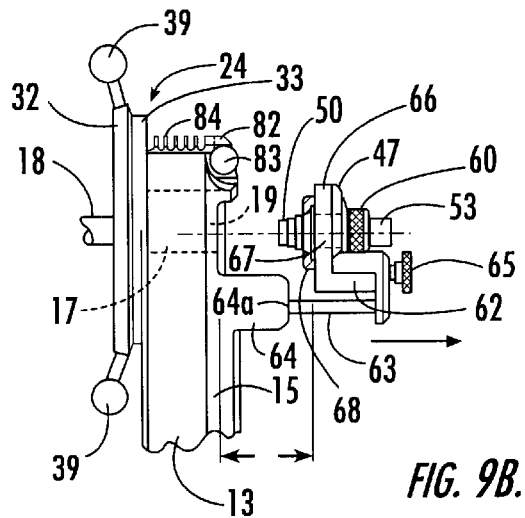
FIG. 9B is a plan view illustrating movement of the support tool of FIG. 9A away from the housing.
Figure 9C:
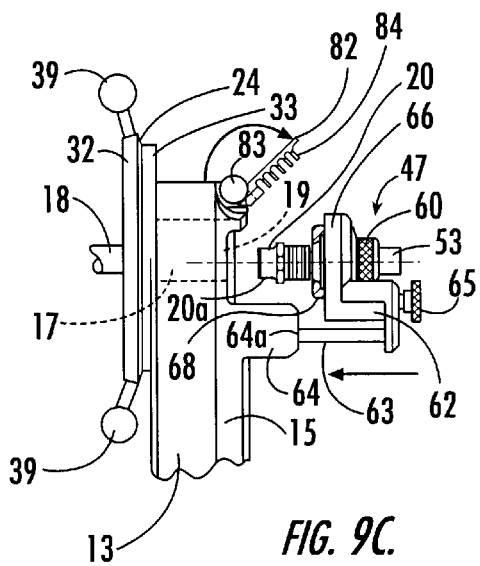
FIG. 9C is a plan view illustrating mounting of the second tubular member to the support tool of FIG. 9A and opening of the hinged door mounted to the housing, according to one embodiment of the present invention.
Figure 9D:
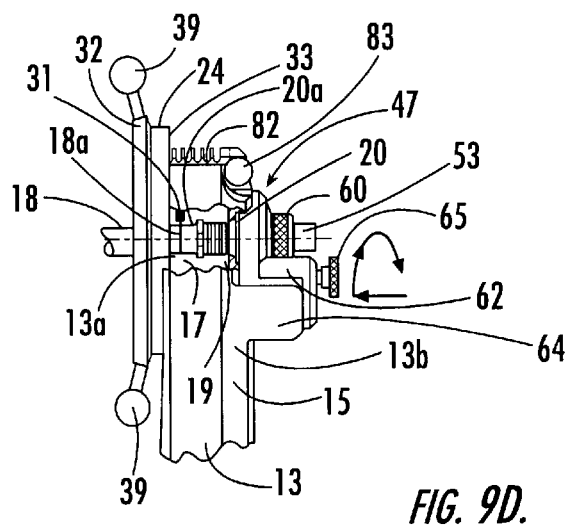
FIG. 9D is a plan view illustrating movement of the support tool of FIG. 9A towards the housing and locking of the support tool to prohibit further movement.

The body portion 13 of the housing 11 has first and second sides 13a, b defining an interior therebetween. As illustrated in FIGS. 1 and 3, the second side 13b of the body portion 13 can include a side plate 15 secured to the adjacent lateral sides of the body portion by suitable fasteners 16. Preferably, the side plate has a thickness of approximately 1 inch. As illustrated in FIG. 9D, the first side 13a of the body portion 13 defines an aperture 17, which opens into the interior of the body portion and is adapted to at least partially receive the abutting end 18a of a first tubular member 18, such as length of hydraulic piping. The second side 13b of the body portion 13 defines an aperture 19, which opens into the interior of the body portion and is coaxially aligned with the aperture 17 defined by the first side 13a of the body portion. The aperture 19 defined by the second side 13b of the body portion 13 is adapted to at least partially receive the abutting end 20a of a second tubular member 20, such as an end fitting. Preferably, the diameter of the aperture 17 defined by the first side 13a of the body portion 13 of the housing 11 is greater than the corresponding diameters of the first and second tubular members 18, 20 so that the welded assembly can be removed from the body portion of the housing after the abutting ends 18a, 20a of the tubular members have been welded together.

Figure 2A:
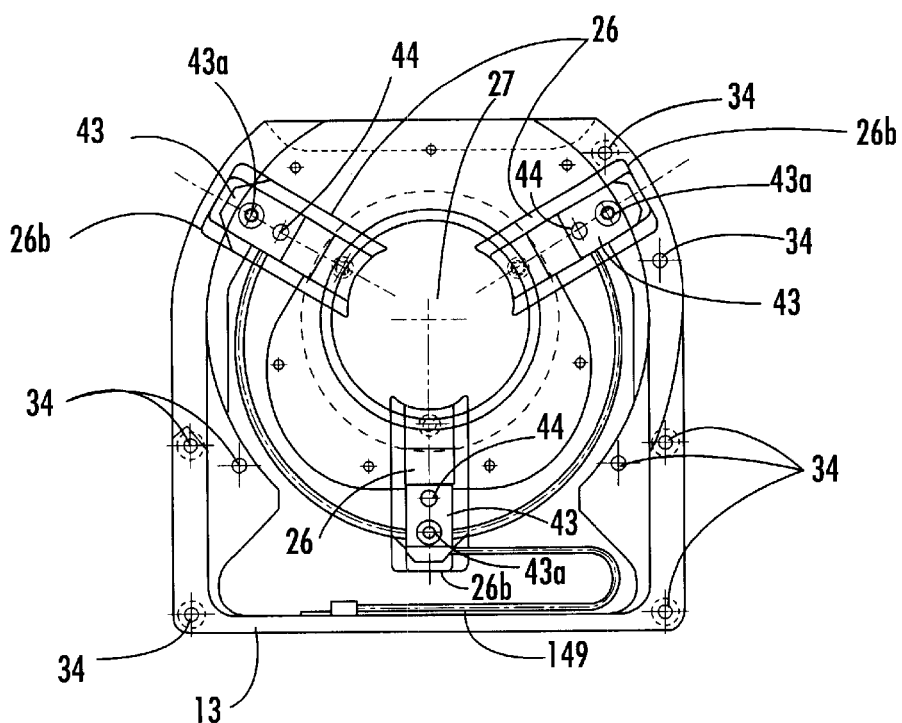
FIG. 2A is a plan view illustrating the ground cable arrangement for the chuck assembly, according to one embodiment of the present invention.
Figure 6:
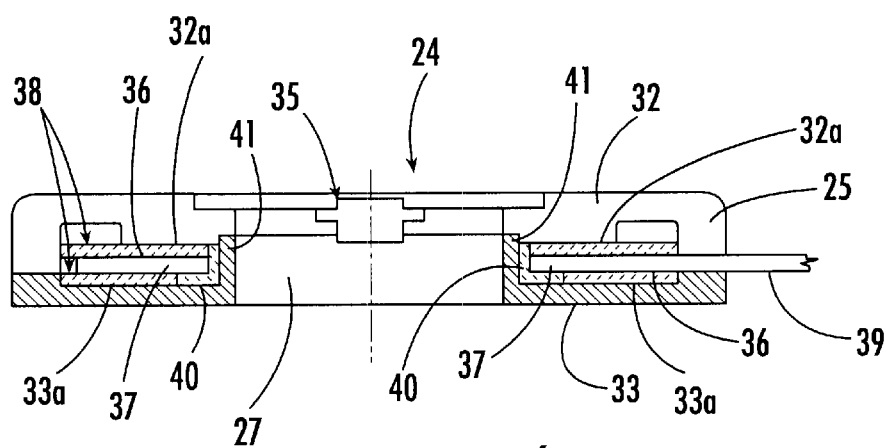
FIG. 6 is cross-sectional view illustrating the chuck assembly of FIG. 2.
Figure 6A:
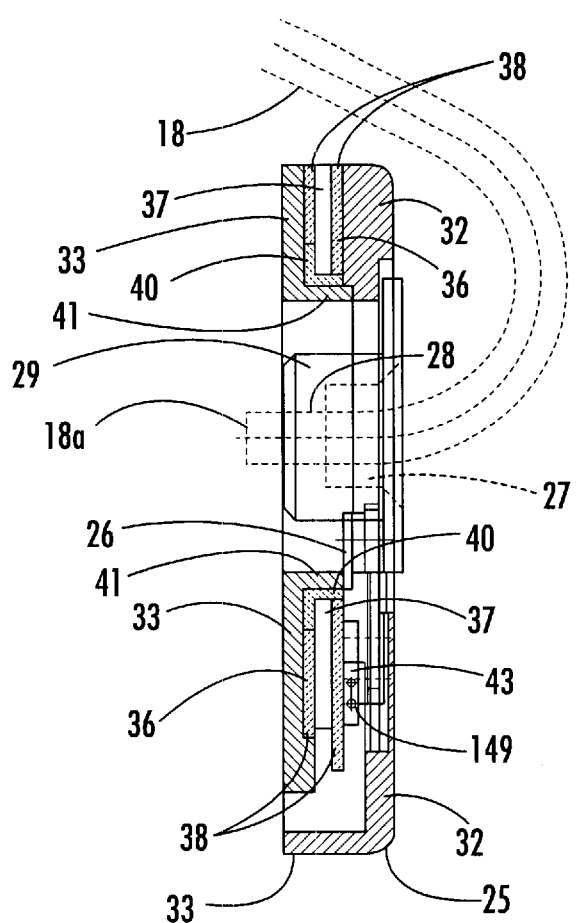
FIG. 6A is cross-sectional view illustrating the chuck assembly of FIG. 2 securing the first tubular member.

As illustrated in FIGS. 2, 2A, 6, and 6A, the welding apparatus 10 includes a chuck assembly 24 for securing the abutting end 18a of the first tubular member 18 within the interior of the body portion 13 of the housing 11. The chuck assembly 24 includes a chuck body 25 and a plurality of chuck jaws 26 and, more preferably, three chuck jaws, which are slidably retained within the chuck body. The chuck body 25 defines an aperture 27 that is coaxially aligned with the aperture 17 defined by the first side 13a of the body portion 13 and that is adapted to receive the abutting end 18a of the first tubular member 18. Each chuck jaw 26 has first and second ends 26a, b. The first end 26a of each chuck jaw defines a gripping surface 28 for frictionally engaging at least a portion of the surface of the first tubular member 18. Preferably, the first end 26 of each chuck jaw 26 includes a replaceable insert 29 that is attached to the chuck jaw by fasteners 30, such as bolts or screws, as illustrated in FIG. 2. The chuck jaw inserts 29 can be configured with a variety of different diameter internal bores so that the welding apparatus 10 can accommodate different diameter tubular members. As illustrated in FIGS. 10A and 10B, the first end 26a of each chuck jaw 26 preferably defines a mounting surface 31 to support the replaceable chuck jaw insert 29 and which includes a threaded aperture 31b to receive the threaded fastener 30 to thereby secure the replaceable insert to the mounting surface. Preferably, as illustrated in FIGS. 2, 2A and 6A, the chuck jaws 26 are electrically grounded to the body portion 13 of the housing 11 by individual wires or cables 149, which extend between the second ends 26b of the chuck jaws and a ground strap 150 secured to the chuck assembly by suitable fasteners. Each cable 149 is attached to a ground lug 43 secured to the second end 26b of the corresponding chuck jaw using a threaded fastener 43a. As illustrated in FIGS. 10A and 10B, the second end 26b of each chuck jaw 26 preferably defines a mounting surface 147 to support the ground lug 43 and which includes a threaded aperture 43b to receive the fastener 43a of the ground lug.

As described below, the chuck assembly 24 includes means, in operable communication with the chuck jaws 26, for moving the chuck jaws to thereby urge at least a portion of each of the gripping surfaces 28 into frictional engagement with the surface of the first tubular member 18. According to one embodiment, as illustrated in FIG. 6, the chuck body 25 includes a face plate 32 and a back plate 33, which are secured together and to the first side 13a of the body portion 13 of the housing 11 by bolts 34. The face plate 32 defines a plurality of tee slots 35 that extend radially from the aperture 27 defined by the chuck body 25, each of which slidably retains a corresponding chuck jaw 26. The facing surfaces of the face plate 32 and back plate 33 define circular recessed surfaces 32a, 33a, which together form a channel 36 when the face plate is secured to the back plate. The channel 36 defined between the face plate and back plate of the chuck body 25 slidably retains a scroll plate 37.

Figure 7:
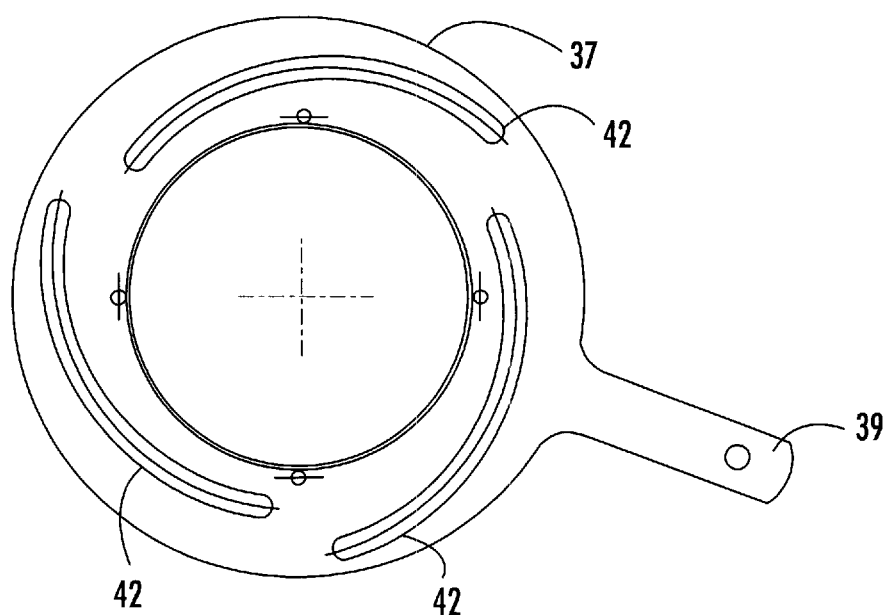
FIG. 7 is a plan view illustrating the scroll plate of the chuck assembly of FIG. 2.

As illustrated in FIG. 7, the scroll plate 37 has a circular configuration corresponding to the shape of the channel 36 and, as illustrated in FIG. 2, has one or more handles 39 that extend away from the chuck body 25. As illustrated in FIGS. 6 and 6A, low-friction guide plates 38 are positioned between the sides of the scroll plate 37 and the recessed surfaces of the face plate 32 and back plate 33 to guide the scroll plate within the channel 36. An L-shaped low-friction bushing 40 is positioned between the side and interior edge of the scroll plate 37 and the recessed surface defined by the back plate. The bushing 40 rotates on a short, hollow shaft 41 protruding from the back plate 33 and is guided by the guide plates 38. As illustrated in FIG. 7, the scroll plate 37 defines a plurality of equally-spaced arcuate slots 42 each of which receives a cylindrical pin 44 protruding from one side of a corresponding chuck jaw 26, as illustrated in FIGS. 10B and 10C. The arcuate slots 42 are preferably configured such that rotation of the scroll plate handle 39 90° in the counterclockwise direction, as illustrated in FIG. 2, rotates the scroll plate 37 forcing the pins 44 of the chuck jaws 26 to move along the corresponding arcuate slot 42 of the scroll plate thereby causing the chuck jaws to slide in unison within the corresponding tee slots 35 in the front plate 32 in a radial direction away from the first tubular member 18. The scroll plate 37 is rotated until the pins 44 of each chuck jaw have moved to the end of the corresponding arcuate slot 42, which defines the point of maximum excursion of the chuck jaws, to permit loading of the first tubular member and/or unloading of the welded tubular assembly at the end of the welding sequence. The gripping surfaces 28 of the chuck jaws are moved into frictional engagement with the surface of the first tubular member 18 by rotating the scroll plate handle 39 90° in the clockwise direction, as illustrated in FIG. 2, which rotates the scroll plate 37 forcing the pin 44 of each chuck jaw to move along the corresponding arcuate slot 42 and causing each of the chuck jaws to slide within the corresponding tee slot 35 in the front plate 32 in a radial direction toward the first tubular member 18. The configuration and positioning of the arcuate slots 42 on the scroll plate 37 produces sufficient frictional force against the pins 44 of the chuck jaws 26 to hold the first tubular member 18 in position during the welding operation.

Figure 8:
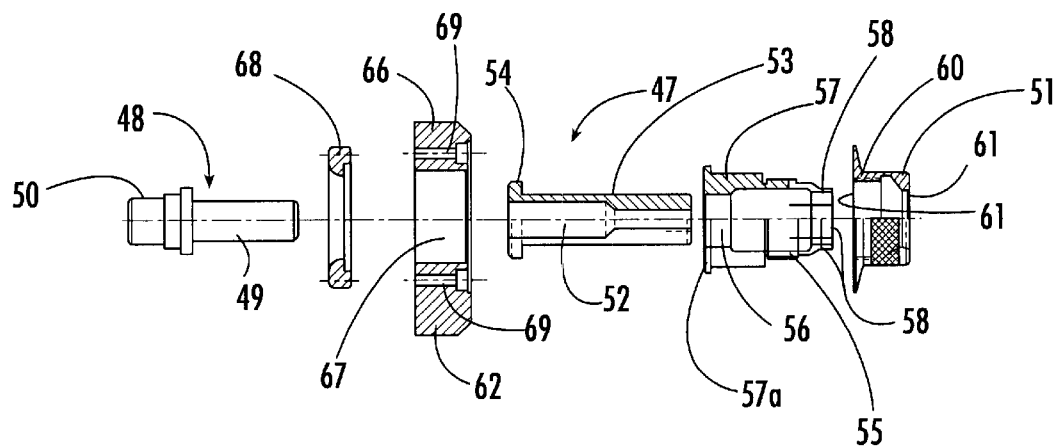
FIG. 8 is an exploded partial cross-sectional view of the support tool of FIG. 3.

The welding apparatus 10 includes a support tool 47 attached to the second side 13b of the body portion 13 of the housing 11 opposite the chuck jaws 26 for supporting the second tubular member 20 such that the abutting end 20a of the second tubular member is secured within the interior of the body portion. According to one embodiment, as illustrated in FIG. 8, the support tool 47 comprises a collet for supporting a second tubular member 20, such as the end fitting illustrated in FIG. 9C. The collet includes a fitting support plug 48, which is preferably a hollow metal tubular member having an elongate portion 49 and adapted at one end 50 to be inserted into the interior of the second tubular member 20 to support the second tubular member. The elongate portion 49 of the support plug 48 is slidably received within an aperture 52 defined in a support plug adapter 53. The end 50 of the support plug 48 can be configured with a variety of different diameter so that the welding apparatus 10 can accommodate different diameter tubular members. The support plug adapter 53 includes a threaded aperture and set screw 54 at the end of the adapter that receives the elongate portion 49 of the support plug 48 so that the elongate portion can be secured within the aperture 52 of the support plug adapter. The support plug adapter 53 is slidably received within an aperture 56 defined in a support plug collet 57. One end of the support plug collet 57 is split into flexible segments 58 and, preferably, eight flexible segments. The support plug adapter 53 is secured within the aperture 56 defined by the support plug collet 57 by a threaded locking knob 60, which defines an aperture 61 having threads corresponding to the threads 55 on the external surface of the support plug collet 57 adjacent the flexible segments 58. As the locking knob 60 is threaded onto the support plug collet 57, the flexible segments 58 of the support plug collet are urged by a tapered surface 51 defined inside the locking knob into frictional engagement with the support plug adapter 53 securing the axial position of the support plug adapter.

Figure 8A:
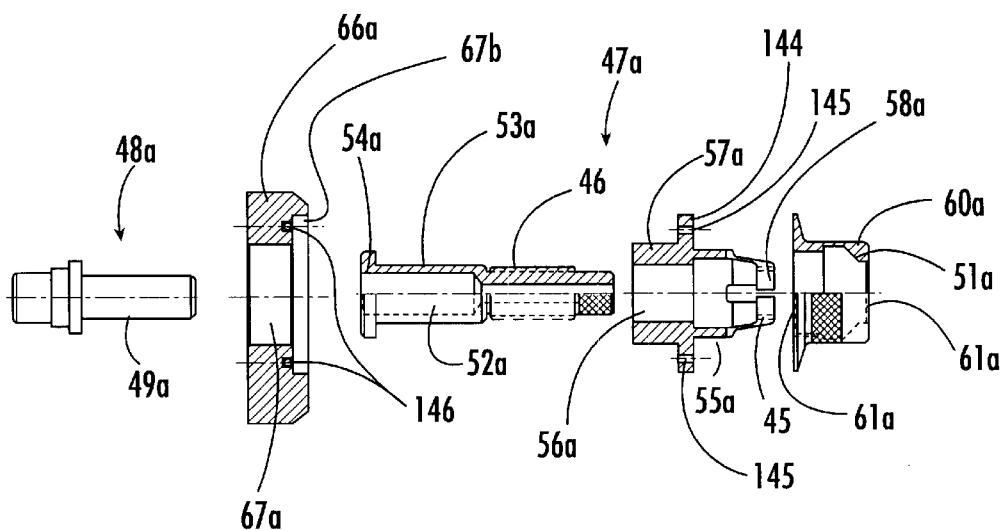
FIG. 8A is an exploded partial cross-sectional view of a support tool, according to an another embodiment of the present invention.

In an alternate embodiment of the support tool 47a, as illustrated in FIG. 8A, the elongate portion 49a of the support plug 48a is slidably received within an aperture 52a defined in a support plug adapter 53a, as described above. The support plug adapter 53a includes a threaded aperture and set screw 54a at the end of the adapter that receives the elongate portion 49a of the support plug 48a so that the elongate portion can be secured within the aperture 52a of the support plug adapter. The support plug adapter 53a is slidably received within an aperture 56a defined in a support plug collet 57a. One end of the support plug collet 57a is split into flexible segments 58a and, preferably, eight flexible segments. The flexible segments 58a have internal acme threads 45 that match external acme threads 46 on the surface of support plug adapter 53a. Advantageously, precise axial adjustment of the fitting support plug 48a is obtained by threading the support plug adapter 53a into or out of the support plug collet 57a to thereby position the fitting support plug at the correct axial location. The support plug adapter 53a is secured within the aperture 56a defined by the support plug collet 57a by a threaded locking knob 60a, which defines an aperture 61a having threads corresponding to the threads 55a on the external surface of the support plug collet 57a adjacent the flexible segments 58a.

As the locking knob 60a is threaded onto the support plug collet 57a, the flexible segments 58a of the support plug collet are urged by a tapered surface 51a defined inside the locking knob into frictional engagement with the support plug adapter 53a securing the axial position of the support plug adapter.

The support tool 47 can be slidably attached to the second side 13b of the body portion 13 of the housing 11 to facilitate attachment of the second tubular member 20 to the end piece 50 of the support plug 48 and, if necessary, replacement of the support plug. According to one embodiment, as illustrated in FIGS. 8 and 9A–9D, the support tool 47 is supported on a shuttle 62 slidably mounted to the second side 13b of the body portion 13 of the housing. The shuttle 62 includes two shafts 63 that slide into and out of corresponding apertures 64a defined by corresponding bosses 64 protruding from the second side 13b of the body portion. The shuttle 62 includes a spring-loaded locking knob 65 to prevent movement of the shuttle once the abutting end 20a of the second tubular member 20 is inserted within the interior of the body portion 13 of the housing 11. The apertures 64a in the bosses 64 protruding from the second side 13b of the body portion 13 preferably include low-friction bushings (not shown) to slidably support the shafts 63 within the apertures 64a. The shuttle 62 includes an upwardly extending flange 66 defining an aperture 67 adapted to receive the support plug collet 57. The support plug collet includes a raised portion 57a at the end of the support plug collet opposite the flexible segments 58, which has a diameter larger than the diameter of the aperture 67 defined by the flange 66. The support tool 47 is secured to the flange 66 by inserting the end of the support plug collet 57 having the flexible segments 58 into the aperture 67 defined by the flange until the raised portion 57a at the opposite end of the support plug collet contacts the side of the flange. A retainer ring 68 can then positioned about the raised portion 57a of the support plug collet 57 and secured to the flange 66 by bolts 69 thereby securing the support tool 47 to the shuttle 62.

In an alternate embodiment, as illustrated in FIG. 8A, the support tool 47a is secured to the flange 66a by inserting the end of the support plug collet 57a that initially receives the support plug adapter 53a into the aperture 67a defined by the flange until the raised portion 144 protruding from the peripheral edge of the support plug collet is seated within a recess 67b defined by the aperture 67a in the flange. The recess 67b has a diameter approximately equal to the diameter of the raised portion 144 of the support plug collet 57a so that the raised portion is flush with the side of the flange 66a when seated within the recess. The raised portion 144 of the support plug collet 57a includes apertures 145 corresponding to threaded apertures 146 defined within the recess, which receive threaded fasteners (not shown), such as screws or bolts, to thereby secure the support tool 47a to the shuttle 62. Preferably, the threaded fasteners are flush with the side of the flange 66a.

As illustrated in FIG. 11, the spring-loaded locking knob 65 of the shuttle 62 is attached to a shaft 21, which extends through a washer 22 and into an aperture 143 defined in the flange 66 of the shuttle. The washer 22 preferably is constructed of nylon or Delrin®, which can be procured from E. I. Du Pont De Nemours and Company. A coil spring 23 is positioned about the shaft 21 inside the aperture 143 defined by the flange 66 to thereby bias the shaft in a direction towards the locking knob 65. The end of the shaft 21 opposite the locking knob includes an end piece 118 secured to the shaft by a screw 119, which end piece defines external acme threads 118a. The coil spring 23 biases the shaft 21 toward the locking knob such that the end piece 118 of the shaft is seated within a recess portion 143a of the aperture 143 in the flange 66 of the shuttle. The second side 13b of the body portion 13 of the housing 11 defines an aperture 141 coaxially aligned with the aperture 143 in the flange 66. A bushing 142 is mounted within the aperture 141 in the second side 13b of the body portion of the housing, which defines internal acme threads 142a corresponding to the threads 118a on the end piece 118 of the shaft 21.

After the abutting end 18a of the first tubular member 18 is secured in place within the housing 11, the second tubular member 20 is placed on the support tool 47 and then the abutting end 20a of the second tubular member is inserted into the housing into abutting contact with the abutting end of the first tubular member. As illustrated by the directional arrows in FIGS. 9A and 9B, the second tubular member 20 is placed on the end 50 of the fitting support plug 48 by first turning the shuttle locking knob 65 90° counterclockwise to unthread the end piece 118 of the shaft 21 from the bushing 142 in the second side 13b of the body portion 13 of the housing 11 to thereby unlock the shuttle 62. The coil spring 23 biases the shaft 21 towards the locking knob 65 to withdraw the end piece 118 from the bushing 142 and seat the end piece within the recess portion 143a of the aperture 143 defined by the flange 66. The shuttle 62 can then be moved away from the second side 13b of the body portion 13 of the housing 11 by sliding the shafts 63 out of the apertures 64a in the bosses 64 on the second side of the housing. As illustrated in FIG. 9C, the second tubular member 20, which in this case is an end fitting, is placed on the end 50 of the fitting support plug 48 by inserting the end of the support plug into the interior of the second tubular member. As illustrated in FIG. 9D, the abutting end 20a of the second tubular member 20 is then inserted within the interior of the body portion 13 of the housing 11 by moving the shuttle 62 toward the second side 13b of the body portion, which slides the shafts 63 into the apertures 64a defined by the bosses 64 on the second side 13b of the body portion. Once the abutting end 20a of the second tubular member 20 is properly positioned within the interior of the body portion 13 of the housing 11, the shuttle 62 is locked in place by pushing the spring-loaded shuttle locking knob 65 inward and turning the locking knob 90° clockwise to insert and thread the end piece 118 of the shaft 21 into the bushing 142 in the second side 13b of the body portion of the housing.

Preferably, as illustrated in FIG. 9C, the body portion 13 of the housing 11 can include a hinged door 82 between the first and second sides 13a, 13b of the body portion that can be opened when inserting the abutting ends 18a, 20a of the first and second tubular members 18, 20 into the interior of the body portion to assure proper positioning of the abutting ends relative to the welding electrode. The hinged door 82 is mounted to the body portion 13 of the housing 11 by hinges 83 secured by threaded fasteners 83a to the second side 13b of the body portion of the housing and is maintained in the closed position by gravity. The hinged door 82 is opened by turning the cover knob 148 clockwise and closed by turning the cover knob counterclockwise.

The welding apparatus 10 also includes a welding electrode 70 movably mounted within the interior of the housing 11 and projecting toward the abutting ends 18a, 20a of the first and second tubular members 18, 20 to thereby define an arc gap between the electrode and the abutting ends. The welding electrode 70 preferably comprises a nonconsumable tungsten electrode. As described below, the welding apparatus 10 includes means, in operable communication with the welding electrode 70, for moving the electrode circumferentially about the abutting ends 18a, 20a of the first and second tubular members 18, 20 to thereby form the weld joint.

According to one embodiment, as illustrated in FIGS. 4 and 4A, the welding apparatus 10 includes an orbital weld rotor assembly 73. The orbital weld rotor assembly 73 includes a rotor 74, which defines a central aperture 76 adapted to receive the abutting ends 18a, 20a of the first and second tubular members 18, 20, and which is rotatably mounted within a rotor housing 75. Preferably, the rotor housing 75 is constructed of an electrically insulating, temperature-resistant, nonmetallic composite material, such as an epoxy glass laminate, for example NEMA grade G-10, or poly etheretherketone ("PEEK"), to maintain electrical isolation of the welding circuit components. The rotor housing 75 includes a main portion 75a and a removable side plate 75b. The side plate 75b of the rotor housing 75 is removably attached to the main portion 75a using suitable O-ring seal washers 79a and fasteners 79, such as bolts or screws, and can be removed during maintenance and/or replacement of the rotor 74. The rotor housing 75 preferably defines a U-shaped end having a circular opening 80 coaxially aligned with the central aperture 76 defined by the rotor 74. As illustrated in FIG. 4, the rotor housing is preferably connected to the positive welding cable 89a and is grounded to the chuck body through the ground strap 150, which is connected by a suitable fastener 150a to the rotor housing.

The rotor 74 can have an open C-shaped configuration, as illustrated in FIGS. 4 and 4A. In another embodiment, as illustrated in FIG. 4B, the rotor 74a has a circular configuration. Preferably, the rotor is constructed of copper or a copper alloy, such as beryllium copper alloy. The rotor 74 is mounted within the U-shaped end of the rotor housing 75 such that a portion of the rotor is exposed. As illustrated in FIGS. 4 and 4A, the rotor 74, 74a is rotatably supported within the rotor housing by a low-friction, temperature-resistant rotor guide ring 152 attached to the main portion 75a of the rotor housing. The guide ring 152 is seated on a circular ridge 153 defined by the interior surface of the main portion 75a of the rotor housing and is secured to the main portion by threaded fasteners 152a, such as screws or bolts. The guide ring 152 projects into a precision groove 154 defined by the side face of the rotor 74, 74a and provides the entire peripheral support for the rotor such that the rotor does not contact the rotor housing 75. The engagement of the rotor 74, 74a and the guide ring 152 maintains the concentricity of the rotor with respect to the first and second tubular members 18, 20. As discussed more fully below, a copper conductor ring 155 is positioned in intimate contact with the face 86 of the rotor 74, 74a facing the side plate 75b of the rotor housing 75. The conductor ring 155 is maintained in position by a copper alloy plate backing spring 156 having a plurality of flexible fingers 156a on the side facing the conductor ring, which apply force between the insulating side plate 75b of the rotor housing 75 and the conductor ring.

The orbital welding apparatus 73 is mounted using suitable threaded fasteners to the body portion 13 of the housing 11 within the interior space defined by the first and second sides 13a, b of the body portion such that the central aperture 76 of the rotor 74, 74a is coaxially aligned with the apertures 17, 19 defined by the first and second sides 13a, b of the body portion of the housing. In one embodiment, the fasteners 79 attaching the side plate 75b to the main portion 75a of the rotor housing 75 pass through the main portion of the rotor housing and attach to threaded apertures (not shown) in the back plate 33 of the chuck body 25. In another embodiment, the rotor housing 75 is mounted to the side plate 15 and the chuck assembly 24 is mounted directly to the rotor housing such that the rotor housing comprises the first side 13a and lateral sides of the body portion 13 of the housing 11.

The welding electrode 70 can be attached directly to the rotor 74 by a set screw 71 or can be attached to the rotor using an offset electrode holder 159, as is known in the art. According to one embodiment, as is illustrated in FIG. 4A, the rotor 74 defines an aperture 80 that extends radially from the peripheral edge of the rotor through to the central aperture 76 of the rotor. The aperture 80 is adapted to receive the welding electrode 70, which has a tip 70a and a base portion 70b. The welding electrode is secured within the aperture 80 by inserting the tip 70a of the electrode into the aperture 80 and threading the set screw 71 into the threaded aperture 71a on the side of the rotor. Once the welding electrode 70 is secured within the aperture 80, the tip 70a of the electrode will project radially into the central aperture 76 defined by the rotor. According to one embodiment (not shown), a tungsten carbide ball is inserted into the threaded aperture 71a between the set screw 71 and the welding electrode 70.

In another embodiment, as illustrated in FIGS. 4B through 4F, the welding electrode 70 is attached to the rotor 74a using an offset electrode holder 159. Weld joint access requirements frequently require the use of an offset electrode holder to position the axis of the welding electrode 70 along the axis of the first and second tubular members 18, 20 and in close proximity to the mechanism that secures the tubular members for welding. Additionally, an offset electrode holder is typically required to accommodate welding of curvilinear tubular members or members in which the tubular members have only a limited length of straight tubing adjacent to the nearest bend. To accommodate these minimum access situations, preferably the welding electrode 70 is axially offset from the center axis of the rotor 74a toward the side of the rotor facing the chuck assembly 24. The offset electrode holder can be fastened permanently to the rotor. However, this arrangement requires that the welding electrode be installed and the arc gap adjusted within the confines of the interior defined by the first and second sides 13a, b of the body portion 13 of the housing 11, which can result in maladjusted arc gaps and frequent servicing or maintenance to retrieve electrodes that have been inadvertently dropped into the weld head drive train mechanism during installation and adjustment. Preferably, as illustrated in FIGS. 4B through 4F, the welding electrode 70 is installed in the offset electrode holder 159 and adjusted to the proper arc gap separate from the welding apparatus 10, which permits the efficient interchange of preset electrode holder assemblies to accommodate different diameter tubular members. As illustrated in FIGS. 4B, 4C, and 4D, the rotor 74a includes a mounting surface 158 to support the electrode holder 159 and a recess 151 to position the electrode holder behind the rotor guide ring groove 154a. The welding electrode 70 can be secured to the electrode holder 159 by a set screw, but, preferably, is secured to the electrode holder 159 using a collet 160. As discussed above, a tungsten carbide ball may be inserted between the set screw and the welding electrode. The electrode holder 159 includes a metallic frame 161 having flange 162 defining two slots 163 that receive mechanical fasteners 164 threaded into the mounting surface 158 of the rotor 74a for securing the electrode holder 159 to the rotor.

As described above, the rotor 74a is mounted within the U-shaped end of the rotor housing 75 such that a portion of the rotor is exposed. Preferably, installation and removal of the offset electrode holder 159 is accomplished through a hinged door 82 between the first and second sides 13a, 13b of the body portion 13 of the housing 11 that can be opened, as illustrated in FIG. 9C, when inserting and installing the electrode holder. As illustrated in FIGS. 4E and 4F, the electrode holder is inset into the recess 151 in the side face of the rotor 74a to position the electrode holder behind the rotor guide ring groove 154a and prevent interference with the rotor guide ring 152. To install the electrode holder 159, the electrode holder is inserted through the access opening in the top of the body portion 13 of the housing 11 and placed on the mounting surface 158 of the rotor. The electrode holder is then indexed to the right side of the recess 151 provided in the face of the rotor and pushed to the back of the recess. The electrode holder 159 is then moved laterally to the left such that the slots 163 in the flange 162 slide underneath the heads of the two fasteners 164 threaded into the mounting surface of the rotor. While the electrode holder 159 is maintained in position at the back of, and to the left of, the recess 151, both of the fasteners 164 are tightened. The electrode holder is removed by loosening the fasteners 164 and moving the electrode holder, as discussed above, but in reverse order, so as to remove the fasteners from the slots 163.

Preferably, prior to installing and securing the electrode holder 74a to the mounting surface 158 of the rotor 74a, the arc gap a between the welding electrode and the first and second tubular members 18, 20 is preset using a set gage tool 170, as illustrated in FIG. 12. The electrode set gage tool 170 includes a bridge 171, clamp plate 172, torsion spring 173, lever 174, gage block 175 and base plate 176. The clamp plate 172 pivots about pins 172a at both ends and utilizes the torsion spring 173 to apply a downward force to maintain contact between the electrode holder 159 and the index surface 177 of the bridge 171. In another embodiment (not shown), additional clamping force is applied by means of a knob threaded into the index surface 177 of the bridge 171 through a mating slot in the clamp plate 172. As illustrated in FIG. 12, the gage block 175, positioned underneath the bridge 171 and fastened to the base plate 176, has a plurality of precision height gage pads 178 to enable setting the arc gap a for different diameter tubular members. The relationship between the desired arc gap a from the welding electrode 70 to the abutting ends 18a, 20a of the first and second tubular members 18, 20 and the gage distance β between the index surface 177 and the gage pad 178 is illustrated in FIGS. 12 and 12C.

In order to form an arc between the tip 71 of the welding electrode 72 and the abutting ends 18a, 20a of the first and second tubular members 18, 20, the electrode is in electrical communication with a welding energy source (not shown). As noted above, the rotor 74, 74a can have an open C-shaped configuration, as illustrated in FIGS. 4 and 4A, or more preferably, a continuous circular configuration as illustrated in FIG. 4B. For either configuration, the rotor 74, 74a is constructed of an electrically conductive material, such as copper or a copper alloy, and preferably, a beryllium copper alloy. The rotor 74, 74a is in electrical communication with the electrode 70 either by direct contact with the electrode, as illustrated in FIGS. 4 and 4A, or indirectly through the electrode holder 159. The rotor is also in intimate contact and electrical communication with the conductor ring 155. The conductor ring includes a copper tube 77a that is connected to the incoming negative welding cable 89a from the welding energy source (not shown), which cable, as discussed more fully below, preferably includes a coaxial cable that is adapted to provide both fluid coolant and welding energy to the conductor ring. The welding cable 89a extends through an aperture 90 defined at the base of the rotor housing 75. During welding, the rotor 74, 74a is rotated to move the welding electrode 70 circumferentially about the abutting ends 18a, 20a of the first and second tubular members 18, 20 to thereby form a weld joint. As the rotor 74, 74a rotates, the conductor ring 155 slides along the side 86 of the rotor supplying welding energy from the electrical source to the welding electrode 70 to form an arc across the arc gap defined between the tip 71 of the electrode and the abutting ends 18a, 20a of the first and second tubular members 18, 20.

The welding apparatus 10 also includes means, in operable communication with the welding electrode 70, for moving the electrode circumferentially about the abutting ends 18a, 20a of the first and second tubular members 18, 20 to thereby form the weld joint. The moving means may include a drive assembly 92 and a motor 93 in operable communication with the drive assembly. Preferably, the motor includes a tachometer 94 and/or a digital encoder 95 to measure the angular velocity of the motor so that the motor can be controlled by either an analog or digital computer, respectively, as described below. According to one embodiment, the motor 93 is an Electro-Craft 372-013-404-007 model motor, which is a 24 VDC, fractional HP servomotor with a 100:1 ratio reduction gearbox 102 attached to one end and a tachometer 94 and digital encoder 95 attached in-line on the other end. The motor 93 is mounted inside the motor cover 14 through a U-shaped mounting bracket 96. One side of the U-shaped mounting bracket 96 is secured to the side plate 15 of the body portion 13 of the housing 11 using threaded fasteners such as bolts 97. Preferably, the mounting bracket 96 is fabricated from an insulating material such as nylon or Delrin®, which can be procured from E. I. Du Pont De Nemours and Company, to enhance the electrical isolation of the motor. The motor 93 is then mounted to the other side of the U-shaped mounting bracket 96 by securing a mounting plate 98 attached to the motor casing 99 to the mounting bracket using threaded fasteners 100 such as bolts.

The drive assembly 92 may include a belt drive, a gear drive or a combination of both. According to one embodiment, as illustrated in FIG. 1, the shaft (not shown) of the motor 93 is connected to one end of an extension shaft 101 through a gearbox 102, as is known in the art. The gearbox 102 includes a shaft 103, which extends from the gearbox to the extension shaft 101 through an aperture 104 defined in the U-shaped mounting bracket 96. The other end of the extension shaft 101 is connected through a first hub 105 of a self-aligning insulating coupling 107, which insulates the motor 93 from the electric current supplied to the welding electrode 70. The first hub 105 has a rectangular-shaped tang that engages a rectangular-shaped recess on one end of the insulating coupling 107. The other end of the insulating coupling 107 includes a rectangular-shaped recess that engages a rectangular-shaped tang on the facing side of a second hub 108, which is attached to another shaft 109. Preferably, the insulating coupling 107 is a solid cylinder of insulating material, such as Delrin®, which can be procured from E. I. Du Pont De Nemours and Company. The axes of the two rectangular shaped recesses can be oriented at 90° to one another to provide the radial self-adjustment of a typical Oldham coupling. Alternate flexible coupling configurations, such as splined couplings, could be used in lieu of an Oldham coupling. As illustrated in FIGS. 1 and 4, the shaft 109 is connected to a sprocket 110 contained within the rotor housing 75. As illustrated in FIGS. 4, 4A, and 4B, the rotor 74, 74a has gear teeth 111 along the peripheral edge of the rotor, which engage a drive chain 112 extending between the rotor and the sprocket 110. A chain tightening mechanism, such as idler gears 106, as is known in the art, can be installed within the rotor housing 75 using suitable fasteners 106a to enable the drive chain 112 to be tightened when necessary.

The rotational torque of the motor 93 is transmitted through the drive assembly 92, including the gearbox 102, extension shaft 101, insulating coupling 107, sprocket 110 and drive chain 112, to rotate the rotor 74, 74a to move the welding electrode 70 circumferentially about the abutting ends 18a, 20a of the first and second tubular members 18, 20 to thereby form the weld joint. In an alternate embodiment, the extension shaft 101 is replaced with an adjustable slip clutch (not shown), as is known in the art, to limit the amount of rotational torque transferred from the motor to the rotor 74 so as to increase operator safety and prevent damage to the rotating components of the drive assembly 92 if rotation of the rotor is obstructed.

The welding apparatus 10 can also include a computing means in electrical communication with the motor 93. According to one embodiment, as illustrated in FIG. 1, the welding apparatus 10 includes one or more receptacles or barrier terminal strips 114 having a plurality of terminals 114a, which terminate the wiring from the motor 93, tachometer 94, digital encoder 95 and, in some embodiments, the wiring from the orbital weld rotor assembly 73. The receptacle includes a frame 115 having a flange 115a, which is secured through bolts 116 to the underside of the U-shaped mounting bracket 96. Preferably, one terminal strip 114 is attached to each side of the frame 115. The terminals of the terminal strip 114 are easily accessible by removing the fasteners securing the motor cover 14 to the base plate 12 and then removing the motor cover. Preferably, the frame 115 includes a single quick disconnect plug/receptacle 72, which is connected to a mating quick-disconnect electrical plug (not shown), which terminates the control cable (not shown) for the motor 93, tachometer 94, digital encoder 95 and, in some embodiments, the orbital weld rotor assembly 73. The control cable preferably is contained within a flexible convoluted conduit that passes through a strain relief bushing 78 in the end of the motor cover 14. The computing means is in electrical communication with the motor 93 so as to move the welding electrode 70 circumferentially about the abutting ends 18a, 20a of the first and second tubular members 18, 20 to thereby form the weld joint. The computing means preferably includes a computer, microprocessor, or controller operating under software control. According to one embodiment, the motor 93 includes a tachometer 94 and the computing means includes an analog computer. According to still another embodiment, the motor includes a digital encoder 95 and the computing means includes a digital computer. The computing means will also be in electrical communication with the welding electrode, gas supply, and coolant supply, however, electrical communication of the computing means with the welding electrode gas supply, and coolant supply is not necessary to practice the invention.

During the welding process, the temperature inside the housing 11 and, in particular, the rotor housing 75 increases appreciably due to the heat generated during the welding process. The electrical insulating materials used to construct the rotor housing 75 are typically also thermal insulators as well. Consequently, since the welding is performed within the small volume defined by the aperture 76 of the rotor 74, 74a, the excess heat generated by the welding arc is largely contained within the rotor housing and transmitted to the orbital weld rotor assembly 73. The high-duty cycle required for high volume orbital-welding applications requires the use of internal fluid cooling to remove the excess welding heat. Heat transfer to the coolant is accomplished by a closed loop fluid heat exchanger system in the welding apparatus 10. According to one embodiment, the orbital weld rotor assembly 73 includes a pair of standard coaxial welding cables 89a, 89b that connect the electrical components of the orbital weld rotor assembly to the welding energy source (not shown). Preferably, the coaxial cables 89a, 89b also provide and remove coolant to cool the welding cables and the internal components of the orbital weld rotor assembly 73. According to one embodiment (not shown), each coaxial cable can be constructed of an external plastic hose with an internal stranded flexible welding conductor cable. The area between the inner wall of the plastic hose and the cable is filled with circulating coolant, such as water. The coolant is introduced from a coolant supply source (not shown) into the negative welding cable 89a, passes through a copper inlet tube 77a and into the copper conductor ring 155, circulates through internal passages (not shown) in the conductor ring, and then returns through a copper tube 77b to the positive (ground) welding coaxial cable 89b and finally to the coolant supply source to be recycled. An insulating hose 179b isolates the copper water tube 77b connected to the positive welding cable 89b from the tube 77a connected to the negative conductor ring. An insulating hose 179a isolates the copper tube 77a connected to the negative welding cable 89a from other components within the orbital weld rotor assembly 73. The coolant is essentially electrically non-conducting. Heat transfer from the rotor 74, 74a to the conductor ring 155 is accomplished by the intimate contact between one face of the fluid-cooled conductor ring and the side face 86 of the rotor. This intimate contact is maintained by the copper-alloy plate backing spring 156, which has flexible fingers 156a on one side that apply force to the face of the conductor ring 155. The relatively large surface contact area between the conductor ring and the side face 86 of the rotor 74, 74a efficiently accomplishes the thermal transfer of the excessive welding heat from the rotor and minimizes the current density to prevent electrical arcing between the conductor ring and rotor during transfer of the welding current. As illustrated in FIG. 4, preferably, a flexible, convoluted plastic conduit 180 carries the two welding cables 89a, 89b, the inert gas hose, which is discussed below, and an electrical control cable (not shown) to the orbital weld rotor assembly 73. The conduit 180 preferably enters the strain relief bushing 78 in the end of the motor housing 14 and is directed along the upper surface of the base plate 12 in the area underneath the motor 93 and barrier terminal strips 114 to the orbital weld rotor assembly.

To shield the molten metal within the weld area from the ambient atmosphere and prevent contamination of the weld joint, inert gas, such as argon, helium or a mixture of both, is preferably injected into the arc gap between the tip 71 of the welding electrode 70 and the abutting ends 18a, 20a of the first and second tubular members 18, 20 prior to, during, and after welding. According to one embodiment, as illustrated in FIG. 4, a gas supply hose 113 extends from a gas source (not shown) to the aperture 90 defined in the base of the rotor housing 75 so that the end of the gas supply hose is in fluid communication with the interior of the rotor housing. As illustrated in FIGS. 4 and 4A, the rotor 74, 74a preferably includes a plurality of apertures 59 extending radially from the peripheral edge of the rotor through to the central aperture 76 of the rotor. The inert gas injected from the end of the gas supply hose 113 into the rotor housing 75 partially pressurizes the interior of the rotor housing forcing the inert gas through the apertures 59 defined in the rotor 74 into the central aperture 76 and arc gap thereby shielding the weld area.

In an alternate embodiment (not shown), inert gas is supplied to the interior of the first and second tubular members 18, 20 through a second gas supply hose (not shown), which extends from the gas source to a fitting (not shown) threaded onto the end of the support plug adapter 53. The support plug adapter is in fluid communication with the interior of the support plug 48 such that the inert gas flows into the interior of the support plug. The end 50 of the support plug can include a plurality of apertures (not shown) disposed radially about the periphery of the support plug. The inert gas injected from the end of the gas supply hose 113 into the support plug adapter 53 and then the support plug 48 partially pressurizes the interior of the support plug forcing the inert gas through the apertures defined in the end 50 of the support plug and into the interior of the first and second tubular members 18, 20 to provide additional shielding of the weld area.

Figure 5:
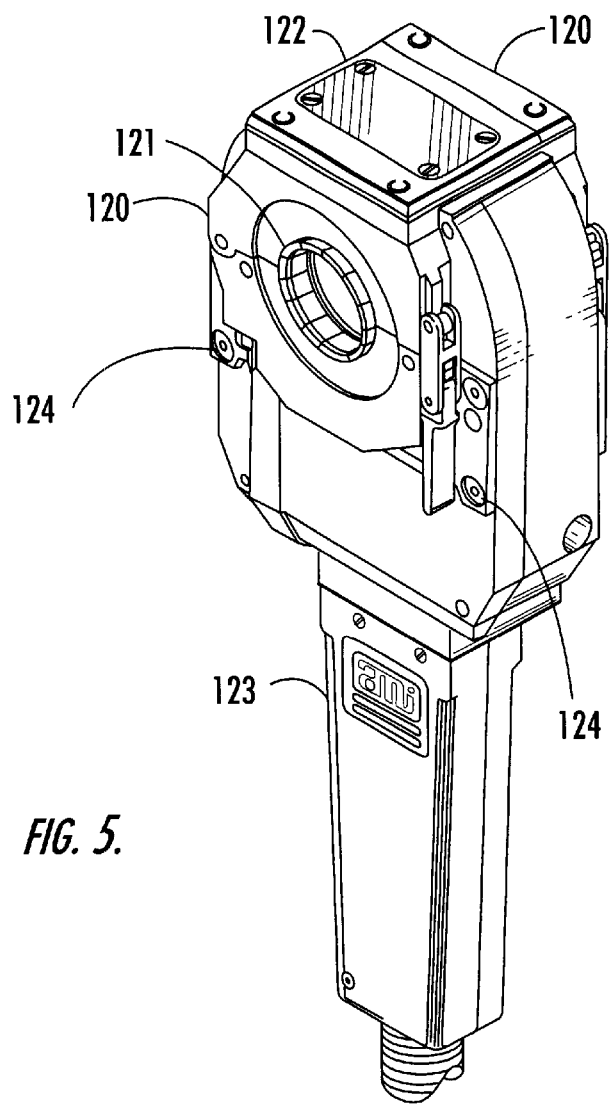
FIG. 5 is a perspective view of a commercially available orbital weld assembly from Arc Machines, Inc.

Advantageously, the orbital weld rotor assembly 73 can include a modified commercially available portable orbital tube-welding head Model 9-2500, which can be procured from Arc Machines, Inc., Pacoima, Calif. ("the AMI Model"). An AMI Model 9-2500 orbital tube-welding head is illustrated in FIG. 5. The AMI Model can be modified by removing the original clamp housings 120, clamp inserts 121, flip open cover 122, handle 123, and internal drive motor-tachometer (not shown). Preferably, a circular beryllium copper alloy rotor 74, which is also available from Arc Machines, Inc., is substituted for the standard split aluminum Model 9-2500 rotor. The sprocket 110 of the drive assembly 92 is rotatable mounted within the rotor housing 75 of the modified Model 9-2500 welding head. As illustrated in FIG. 5, two dowel pins 124 extend from the rotor housing 75 of the modified Model 9-2500 welding head, which can be used to establish the concentricity of the rotor 74, chuck assembly 24 and support tool 47. In addition, where the rotor housing 75 of the modified Model 9-2500 welding head comprises the first side 13a and lateral sides of the body portion 13 of the housing 11, the threaded apertures 125 located above and below the dowel pins 124 can be used to secure the rotor housing to the back plate 33 of the chuck body 25.

Figure 13:
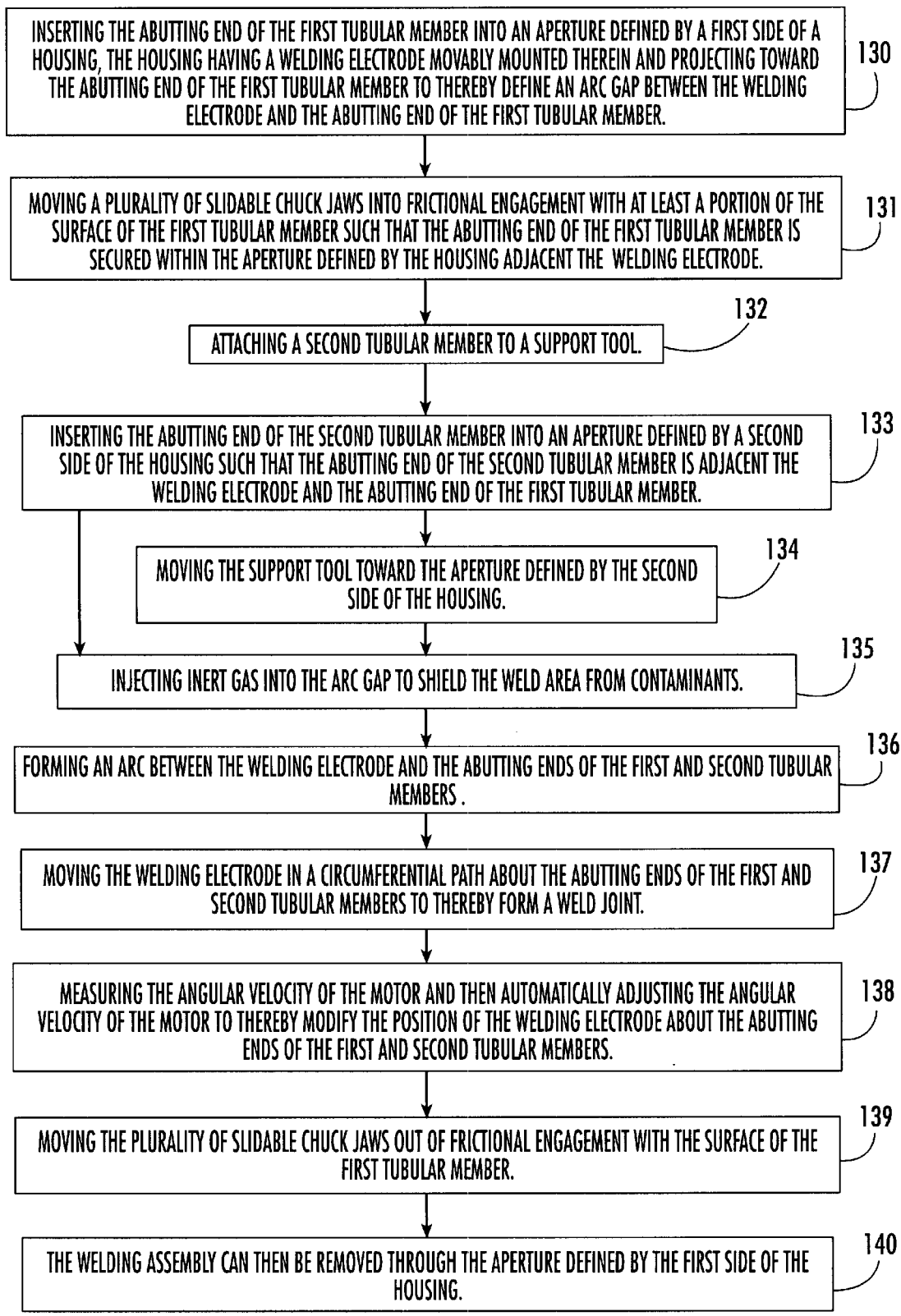
FIG. 13 is a flow chart showing the steps for welding according to one embodiment of the present invention.

The present invention also provides a method of welding the abutting ends of first and second tubular members. As shown in FIG. 13, the method of welding includes the steps of inserting the abutting end of the first tubular member into an aperture defined by a first side of a housing, the housing having a welding electrode movably mounted therein and projecting toward the abutting end of the first tubular member to thereby define an arc gap between the welding electrode and the abutting end of the first tubular member. See block 130. A plurality of slidable chuck jaws are moved into frictional engagement with at least a portion of the surface of the first tubular member such that the abutting end of the first tubular member is secured within the aperture defined by the housing adjacent the welding electrode. See block 131. A second tubular member is attached to a support tool. See block 132. The abutting end of the second tubular member is inserted into an aperture defined by a second side of the housing such that the abutting end of the second tubular member is adjacent the welding electrode and the abutting end of the first tubular member. See block 133. According to one embodiment, the inserting step includes moving the support tool toward the aperture defined by the second side of the housing. See block 134. In an alternate embodiment (not shown), the step of inserting a first tubular member follows the step of inserting a second tubular member. Inert gas is injected into the arc gap to shield the weld area from contaminants. See block 135. An arc is formed between the welding electrode and the abutting ends of the first and second tubular members. See block 136. The welding electrode is moved in a circumferential path about the abutting ends of the first and second tubular members to thereby form a weld joint. See block 137. According to one embodiment, the method may include the steps of measuring the angular velocity of the motor and then automatically adjusting the angular velocity of the motor to thereby modify the velocity of the welding electrode. See block 138. After the abutting ends of the first and second tubular members have been welded together the plurality of slidable chuck jaws are moved out of frictional engagement with the surface of the first tubular member. See block 139. The welded assembly can then be removed through the aperture defined by the first side of the housing. See block 140.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for forming a weld joint between abutting ends of first and second tubular members, comprising:

a housing having first and second sides, said first and second sides of said housing defining an interior therebetween, said first side of said housing defining an aperture adapted to at least partially receive the abutting end of the first tubular member, said second side of said housing defining an aperture coaxially aligned with said aperture defined by said first side and adapted to at least partially received the abutting end of the second tubular member;

a welding electrode, said electrode movably mounted to said interior of said housing and projecting toward the abutting ends of the first and second tubular members to thereby define an arc gap between said electrode and the abutting ends;

a chuck assembly secured to said first side of said housing, said chuck assembly having a plurality of slidable chuck jaws each having first and second ends, said first end of each of said chuck jaws defining a gripping surface for frictionally engaging at least a portion of the surface of the first tubular member such that the abutting end of the first tubular member is secured within said interior of said housing adjacent said welding electrode;

means, in operable communication with said chuck jaws, for moving said chuck jaws to thereby urge at least a portion of each of said gripping surfaces into frictional engagement with the surface of the first tubular member;

a support tool for supporting the second tubular member, said support tool attached to said second side of said housing opposite said chuck jaws such that the abutting end of the second tubular member is secured within said interior of said housing adjacent said welding electrode and the abutting end of the first tubular member; and second means, in operable communication with said welding electrode, for moving said electrode circumferentially about the abutting ends of the first and second tubular members, while the first and second tubular members remain fixed, to thereby form a weld joint.

2. An apparatus according to claim 1 further comprising an electrical source for supplying welding energy to said welding electrode.

3. An apparatus according to claim 1 further comprising a pressurized-gas source for supplying inert gas to said arc gap.

4. An apparatus according to claim 1 wherein said second moving means comprises a drive assembly and a motor in operable communication with said drive assembly, and wherein said drive assembly is selected from a group consisting of a belt drive and a gear drive.

5. An apparatus according to claim 4 wherein said drive assembly further comprises a slip clutch.

6. An apparatus according to claim 4 further comprising computing means in electrical communication with said motor.

7. An apparatus according to claim 6 wherein said motor comprises a tachometer and said computing means comprises an analog computer.

8. An apparatus according to claim 6 wherein said motor comprises a digital encoder and said computing means comprises a digital computer.

9. An apparatus according to claim 1 wherein in said housing comprises a hinged portion between said first and second sides of said housing for observing the positioning of the abutting ends of the first and second tubular members relative to said welding electrode.

10. An apparatus according to claim 1 wherein said support tool comprises a tool selected from the group consisting of a chuck assembly and a collet.

11. An apparatus according to claim 1 wherein said support tool comprises a plurality of support shafts slidably mounted to said second side of said housing such that said support tool is movable relative to said second side of said housing.

12. An apparatus according to claim 1 wherein said first ends of said chuck jaws comprise replaceable inserts to accommodate different diameter tubular members.

13. An apparatus according to claim 1 wherein each of said chuck jaws is electrically grounded to said housing.

14. An apparatus according to claim 1 wherein said welding electrode comprises a nonconsumable tungsten electrode.

15. An apparatus according to claim 1 wherein said housing comprises a base plate to support said housing.

16. An apparatus according to claim 1 wherein the interior of said housing is water-cooled.

17. An apparatus according to claim 3 wherein said inert gas comprises a gas selected from the group consisting of argon and helium.

18. An apparatus for forming a weld joint between abutting ends of first and second tubular members, comprising:

a housing having first and second sides, said first and second sides of said housing defining an interior therebetween, said first side of said housing defining an aperture adapted to at least partially receive the abutting end of the first tubular member, said second side of said housing defining an aperture coaxially aligned with said aperture defined by said first side and adapted to at least partially received the abutting end of the second tubular member;

a welding electrode, said electrode movably mounted within said interior of said housing and projecting toward the abutting ends of the first and second tubular members to thereby define an arc gap between said electrode and the abutting ends;

a chuck assembly secured to said first side of said housing, said chuck assembly comprising:

a plurality of slidable chuck jaws each having first and second ends and first and second sides, said first end of each of said chuck jaws defining a gripping surface for frictionally engaging at least a portion of the surface of the first tubular member, said first side of each of said chuck jaws having a pin protruding therefrom; and a rotatable plate defining a plurality of arcuate slots each adapted to receive the pin protruding from said first side of one of said chuck jaws such that rotation of said plate moves said pin radially along a path defined by said arcuate slot to thereby urge at least a portion of each of said gripping surfaces into frictional engagement with the surface of the first tubular member to thereby secure the abutting end of the first tubular member within said interior of said housing adjacent said welding electrode;

a support tool for supporting the second tubular member, said support tool slidably attached to said second side of said housing opposite said chuck jaws such that said support tool is movable relative to said second side of said housing to position the abutting end of the second tubular member within said interior of said housing adjacent said welding electrode and the abutting end of the first tubular member; and a motor, said motor in operable communication with said welding electrode such that said welding electrode is moved circumferentially about the abutting ends of the first and second tubular members, while the first and second tubular members remain fixed, to thereby form a weld joint.

19. An apparatus according to claim 18 further comprising an electrical source for supplying welding energy to said welding electrode.

20. An apparatus according to claim 18 further comprising a pressurized-gas source for supplying inert gas to said arc gap.

21. An apparatus according to claim 18 wherein said motor comprises a drive assembly, said drive assembly selected from the group consisting of a belt drive and a gear drive.

22. An apparatus according to claim 21 wherein said drive assembly further comprises a slip clutch.

23. An apparatus according to claim 18 further comprising computing means in electrical communication with said motor.

24. An apparatus according to claim 23 wherein said motor comprises a tachometer and said computing means comprises an analog computer.

25. An apparatus according to claim 23 wherein said motor comprises a digital encoder and said computing means comprises a digital computer.

26. An apparatus according to claim 18 wherein in said housing comprises a hinged portion between said first and second sides of said housing for observing the positioning of the abutting ends of the first and second tubular members relative to said welding electrode.

27. An apparatus according to claim 18 wherein said first ends of said chuck jaws comprise replaceable inserts to accommodate different diameter tubular members.

28. An apparatus according to claim 18 wherein each of said chuck jaws is electrically grounded to said housing.

29. An apparatus according to claim 18 wherein said welding electrode comprises a nonconsumable tungsten electrode.

30. An apparatus according to claim 18 wherein said housing comprises a base plate to support said housing.

31. An apparatus according to claim 18 wherein the interior of said housing is water-cooled.

32. An apparatus according to claim 20 wherein said inert gas comprises a gas selected from the group consisting of argon and helium.

33. A method of welding the abutting ends of first and second tubular members, comprising:

inserting the abutting end of the first tubular member into an aperture defined by a first side of a housing, the housing having a welding electrode movably mounted therein and projecting toward the abutting end of the first tubular member to thereby define to thereby define an arc gap between the welding electrode and the abutting end of the first tubular member;

moving a plurality of slidable chuck jaws into frictional engagement with at least a portion of the surface of the first tubular member such that the abutting end of the first tubular member is secured within the aperture defined by the housing adjacent the welding electrode;

attaching the second tubular member to a support tool;

inserting the abutting end of the second tubular member into an aperture defined by a second side of the housing such that the abutting end of the second tubular member is adjacent the welding electrode and the abutting end of the first tubular member;

injecting inert gas into the arc gap;

forming an arc between the welding electrode and the abutting ends of the first and second tubular members; and moving the welding electrode in a circumferential path about the abutting ends of the first and second tubular members, while the first and second tubular members remain fixed, to thereby form a weld joint.

34. A method according to claim 33 wherein said step of inserting a first tubular member follows said step of inserting a second tubular member.

35. A method according to claim 33 further comprising:

measuring the angular velocity of the motor; and automatically adjusting the angular velocity of the motor to thereby modify the position of the welding electrode about the abutting ends of the first and second tubular members.

36. A method according to claim 33 wherein said second inserting step comprises moving the support tool toward the aperture defined by the second side of the housing.

37. A method according to claim 33 further comprising moving the plurality of slidable chuck jaws out of frictional engagement with the surface of the first tubular member after the abutting ends of the first and second tubular members have been welded together.

38. A method according to claim 37 further comprising removing the welded assembly through the aperture defined by the first side of the housing.

* * * * *